(12) United States Patent
Yoon et al.

(10) Patent No.: US 10,777,198 B2
(45) Date of Patent: Sep. 15, 2020

(54) APPARATUS FOR DETERMINING SPEECH PROPERTIES AND MOTION PROPERTIES OF INTERACTIVE ROBOT AND METHOD THEREOF

(71) Applicant: Electronics and Telecommunications Research Institute, Daejeon (KR)

(72) Inventors: Young-Woo Yoon, Daejeon (KR); Jae-Hong Kim, Daejeon (KR); Jae-Yeon Lee, Daejeon (KR); Min-Su Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 115 days.

(21) Appl. No.: 16/102,398

(22) Filed: Aug. 13, 2018

(65) Prior Publication Data
US 2019/0164548 A1    May 30, 2019

(30) Foreign Application Priority Data
Nov. 24, 2017  (KR) .................. 10-2017-0158953
Mar. 26, 2018  (KR) .................. 10-2018-0034715

(51) Int. Cl.
*G10L 15/22*    (2006.01)
*G10L 15/02*    (2006.01)
(Continued)

(52) U.S. Cl.
CPC ........... *G10L 15/22* (2013.01); *B25J 11/0005* (2013.01); *B25J 19/023* (2013.01);
(Continued)

(58) Field of Classification Search
CPC .. B25J 11/0005; B25J 19/023; G06K 9/00335
See application file for complete search history.

(56) References Cited

U.S. PATENT DOCUMENTS 9,431,027 B2    8/2016  Ng-Thow-Hing et al.
10,381,003 B2*  8/2019  Wakisaka ............. B25J 11/0005
(Continued)

FOREIGN PATENT DOCUMENTS

JP    2005003926 A    1/2005
JP    2008254122 A    10/2008
(Continued)

*Primary Examiner* — Abul K Azad
(74) *Attorney, Agent, or Firm* — William Park & Associates Ltd.

(57) ABSTRACT

Disclosed herein are an apparatus and method for determining the speech and motion properties of an interactive robot. The method for determining the speech and motion properties of an interactive robot includes receiving interlocutor conversation information including at least one of voice information and image information about an interlocutor that interacts with an interactive robot, extracting at least one of a verbal property and a nonverbal property of the interlocutor by analyzing the interlocutor conversation information, determining at least one of a speech property and a motion property of the interactive robot based on at least one of the verbal property, the nonverbal property, and context information inferred from a conversation between the interactive robot and the interlocutor, and controlling the operation of the interactive robot based on at least one of the determined speech property and motion property of the interactive robot.

18 Claims, 10 Drawing Sheets

(51) Int. Cl.
  *B25J 11/00* (2006.01)
  *B25J 19/02* (2006.01)
  *G06K 9/00* (2006.01)
  *G10L 25/48* (2013.01)

(52) U.S. Cl.
  CPC .......... *G06K 9/00335* (2013.01); *G10L 15/02* (2013.01); *G10L 25/48* (2013.01); *G10L 2015/223* (2013.01)

(56) References Cited

U.S. PATENT DOCUMENTS

| | | |
|---|---|---|
| 2005/0021334 A1 | 1/2005 | Iwahashi |
| 2012/0191460 A1* | 7/2012 | Ng-Thow-Hing ...... G10L 21/10 704/272 |
| 2017/0113353 A1 | 4/2017 | Monceaux et al. |
| 2017/0148434 A1* | 5/2017 | Monceaux .............. G10L 15/22 |
| 2017/0255616 A1 | 9/2017 | Yun et al. |

FOREIGN PATENT DOCUMENTS

| | | |
|---|---|---|
| JP | 5842245 B2 | 1/2016 |
| KR | 100813668 B1 | 3/2008 |
| KR | 1020170027706 A | 3/2017 |

\* cited by examiner

APPARATUS FOR DETERMINING SPEECH PROPERTIES AND MOTION PROPERTIES OF INTERACTIVE ROBOT AND METHOD THEREOF

CROSS REFERENCE TO RELATED APPLICATIONS

This application claims the benefit of Korean Patent Application No. 10-2017-0158953, filed Nov. 24, 2017, and No. 10-2018-0034715, filed Mar. 26, 2018, which are hereby incorporated by reference in their entirety into this application.

BACKGROUND OF THE INVENTION

1. Technical Field

The present invention relates generally to technology for determining the speech and motion properties of an interactive robot, and more particularly to technology for determining the speech properties and the motion properties of a robot when a human has a conversation with the robot.

2. Description of the Related Art

These days, the purposes of use of robots and fields to which robots are applied have diversified, that is, not only industrial robots mainly applied to assembly lines in a manufacturing process but also robots, such as rescue robots in disaster sites, educational and child-care robots, healthcare robots, killing robots in battlefields, and the like, are being used.

Recently, technology for developing conversational robots for preventing someone from feeling isolated has received a lot of attention in robotics. Conversational robots may have conversations not only with humans but also with other robots and give the feeling as if they were actually joining a conversation by making eye contact with people around them.

When humans have a conversation, they can freely change the pitch of voice and the speech rate, gestures, and the like depending on the context of the conversation or their surroundings. However, robots according to the conventional art may speak depending only on preset vocal characteristics and make only preset gestures. That is, according to the conventional art, because all robots repeat the same type of speech and the same gestures, environmental adaptability and the personality of the robot may not be reflected.

Accordingly, it is necessary to develop a technique for determining the speech properties and the motion properties of a robot in a conversation between a human and the robot in order make humans feel that the robot is friendly and intelligent.

DOCUMENTS OF RELATED ART (Patent Document 1) Korean Patent Application Publication No. 10-2017-0027706, published on Mar. 10, 2017 and titled "Methods and systems for managing dialogs of a robot".

SUMMARY OF THE INVENTION

An object of the present invention is to change the speech property and the motion property of an interactive robot in consideration of the personality thereof and the verbal property of the interlocutor that has a conversation with the interactive robot.

Another object of the present invention is to change the speech property and the motion property of an interactive robot depending on an interlocutor and surroundings in order to make the interlocutor feel that the interactive robot is friendly and intelligent.

In order to accomplish the above objects, a method for determining speech and motion properties of an interactive robot, performed by an apparatus for determining speech and motion properties of an interactive robot, according to the present invention includes receiving interlocutor conversation information that includes at least one of voice information and image information about an interlocutor that interacts with an interactive robot; extracting at least one of a verbal property and a nonverbal property of the interlocutor by analyzing the interlocutor conversation information; determining at least one of a speech property and a motion property of the interactive robot based on at least one of the verbal property, the nonverbal property, and context information inferred from content of a conversation between the interactive robot and the interlocutor; and controlling an operation of the interactive robot based on at least one of the determined speech property and the determined motion property of the interactive robot.

Here, extracting at least one of the verbal property and the nonverbal property of the interlocutor may be configured to extract the verbal property of the interlocutor, including at least one of a pitch of a voice, an amplitude of the voice, and a speed of speech, by analyzing the voice information, or to extract the nonverbal property of the interlocutor, including at least one of a frequency of motions used by the interlocutor and a motion size, by analyzing the image information.

Here, determining at least one of the speech property and the motion property of the interactive robot may be configured to set the speech property of the interactive robot based on at least one of information about default settings of the interactive robot, the context information, and the extracted verbal property.

Here, extracting at least one of the verbal property and the nonverbal property of the interlocutor may include inferring the context information from the content of the conversation with the interlocutor; and extracting information about a change of the verbal property of the interlocutor using a basic verbal property of the interlocutor and using verbal property information of the interlocutor during a preset time period, and determining at least one of the speech property and the motion property of the interactive robot may include determining the speech property of the interactive robot using the context information and using the information about the change of the verbal property of the interlocutor.

Here, inferring the context information may be configured such that, based on the content of the conversation, the context information is calculated to any one of a copy mode for emulating the verbal property of the interlocutor, a default setting mode, and a contrary mode for responding contrary to the verbal property of the interlocutor.

Here, determining at least one of the speech property and the motion property of the interactive robot may be configured to set the motion property of the interactive robot based on at least one of the extracted nonverbal property and information about default settings of the interactive robot.

Here, extracting at least one of the verbal property and the nonverbal property of the interlocutor may include extracting information about a skeleton of the interlocutor from the image information; performing normalization for joint coordinates of the extracted information about the skeleton; calculating the frequency of motions used by the interlocutor using the normalized information about the skeleton; and calculating the motion size of the interlocutor using the normalized information about the skeleton.

Here, calculating the frequency of motions used by the interlocutor may be configured to determine whether the interlocutor uses a motion based on a change in the joint coordinates during a unit time period and to count a number of motions used by the interlocutor during a preset period.

Here, calculating the motion size of the interlocutor may be configured to calculate the motion size of the interlocutor using a difference between a maximum value of the joint coordinates and a minimum value of the joint coordinates during a unit time period.

Here, determining at least one of the speech property and the motion property of the interactive robot may further include determining the motion property of the interactive robot by adding the nonverbal property of the interlocutor, to which a first weight is assigned, and a basic motion property of the interactive robot, to which a second weight is assigned.

Here, the image information about the interlocutor may be captured from a viewpoint of the interactive robot.

Also, an apparatus for determining speech and motion properties of an interactive robot according to an embodiment of the present invention includes an interlocutor conversation information input unit for receiving interlocutor conversation information that includes at least one of voice information and image information about an interlocutor that interacts with an interactive robot; an interlocutor conversation property extraction unit for extracting at least one of a verbal property and a nonverbal property of the interlocutor by analyzing the interlocutor conversation information; a speech and motion determination unit for determining at least one of a speech property and a motion property of the interactive robot based on at least one of the verbal property, the nonverbal property, information about default settings of the interactive robot, and context information inferred from content of a conversation between the interactive robot and the interlocutor; and an interactive robot control unit for controlling an operation of the interactive robot based on at least one of the determined speech property and the determined motion property of the interactive robot.

Here, the interlocutor conversation property extraction unit may extract the verbal property of the interlocutor, including at least one of a pitch of a voice, an amplitude of the voice, and a speed of speech, by analyzing the voice information, or may extract the nonverbal property of the interlocutor, including at least one of a frequency of motions used by the interlocutor and a motion size, by analyzing the image information.

Here, the interlocutor conversation property extraction unit may infer the context information from the content of the conversation with the interlocutor and extract information about a change of the verbal property of the interlocutor using a basic verbal property of the interlocutor and using verbal property information of the interlocutor during a preset time period, thereby enabling the speech and motion determination unit to determine the speech property of the interactive robot using the context information and the information about the change of the verbal property of the interlocutor.

Here, based on the content of the conversation, the speech and motion determination unit may calculate the context information to any one of a copy mode for emulating the verbal property of the interlocutor, a default setting mode, and a contrary mode for responding contrary to the verbal property of the interlocutor.

Here, the interlocutor conversation property extraction unit may extract information about a skeleton of the interlocutor from the image information, perform normalization for joint coordinates of the extracted information about the skeleton, calculate the frequency of motions used by the interlocutor using the normalized information about the skeleton, and calculate the motion size of the interlocutor using the normalized information about the skeleton.

Here, the interlocutor conversation property extraction unit may determine whether the interlocutor uses a motion based on a change in the joint coordinates during a unit time period and count a number of motions used by the interlocutor during a preset period.

Here, the interlocutor conversation property extraction unit may calculate the motion size of the interlocutor using a difference between a maximum value of the joint coordinates and a minimum value of the joint coordinates during a unit time period.

Here, the speech and motion determination unit may determine the motion property of the interactive robot by adding the nonverbal property of the interlocutor, to which a first weight is assigned, and a basic motion property of the interactive robot, to which a second weight is assigned.

Here, the image information about the interlocutor may be captured from a viewpoint of the interactive robot.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
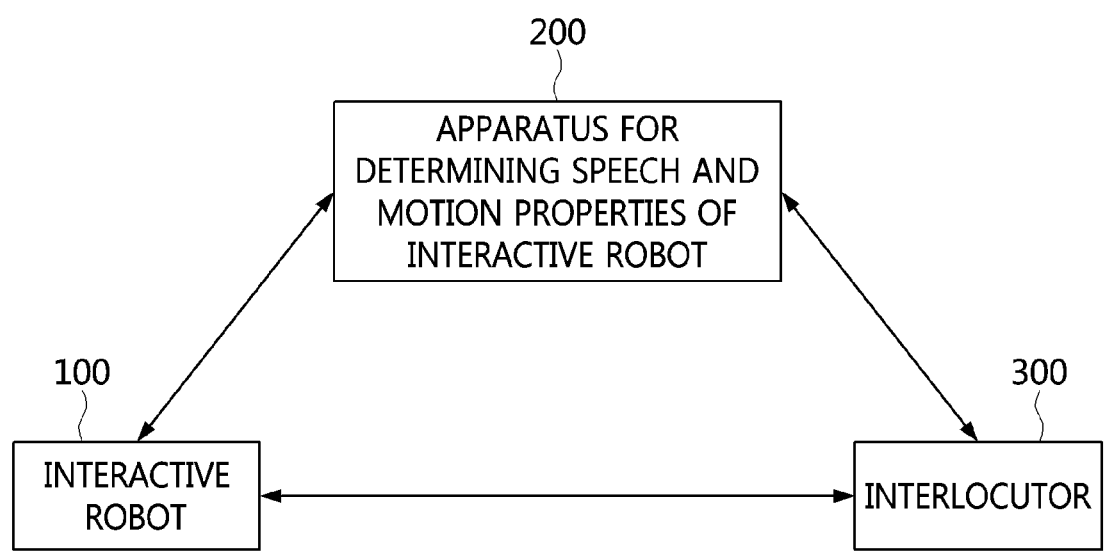
FIG. 1 is a view that schematically shows an environment in which an apparatus for determining the speech and motion properties of an interactive robot according to an embodiment of the present invention is applied.

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that schematically shows an environment in which an apparatus for determining the speech and motion properties of an interactive robot according to an embodiment of the present invention is applied.

As illustrated in FIG. 1, a system for determining the speech and motion properties of an interactive robot according to an embodiment of the present invention may include an interactive robot 100, an apparatus 200 for determining the speech and motion properties of an interactive robot, and an interlocutor 300.

The interactive robot 100 may recognize the speech of the interlocutor 300 using a microphone, create a suitable response to the speech of the interlocutor 300, and output the response through Text-To-Speech (TTS). Also, the interactive robot 100 may output a motion that is appropriate for the response.

Here, the interactive robot 100 may have a conversation with the interlocutor 300 by repeating the process of outputting a response based on a speech property and the process of outputting a motion based on a motion property, the speech property and the motion property being received from the apparatus 200 for determining the speech and motion properties of an interactive robot.

Particularly, the interactive robot 100 may receive an operation control signal, which includes at least one of the speech property and the motion property of the interactive robot 100, from the apparatus 200 for determining the speech and motion properties of an interactive robot. The interactive robot 100 may output a response through TTS depending on the speech property of the operation control signal, or may output a motion by moving the body, the arms, or the like thereof depending on the motion property of the operation control signal.

Here, the speech property of the interactive robot 100 may include at least one of the pitch of voice, the amplitude of voice, and the speed of speech, and the motion property thereof may include at least one of the frequency of use of motions and a motion size.

Also, the technique for enabling the interactive robot 100 to recognize the voice of the interlocutor 300 and to create a response may be the same as the technique used for general chatbots or Artificial Intelligence (AI) speakers.

The apparatus 200 for determining the speech and motion properties of an interactive robot may set the speech property and the motion property of the interactive robot 100 in consideration of at least one of the default settings of the interactive robot 100, context information, and the verbal and nonverbal properties of the interlocutor 300, and may then control the operation of the interactive robot 100 depending on the set properties.

The apparatus 200 for determining the speech and motion properties of an interactive robot may receive interlocutor conversation information that includes at least one of voice information and image information about the interlocutor 300.

Here, the image information about the interlocutor 300 may be captured from the viewpoint of the interactive robot 100. Also, the apparatus 200 for determining the speech and motion properties of an interactive robot may receive the interlocutor conversation information from the interactive robot 100, or may collect the same by itself using modules such as a microphone, a camera, and the like.

Also, when the interlocutor 300 is implemented in the form of a device that is capable of communicating, the apparatus 200 for determining the speech and motion properties of an interactive robot may receive interlocutor conversation information, including at least one of voice information and image information, from the interlocutor 300 implemented in the form of a device.

Also, the apparatus 200 for determining the speech and motion properties of an interactive robot may extract the verbal property and the nonverbal property of the interlocutor by analyzing the interlocutor conversation information.

The apparatus 200 for determining the speech and motion properties of an interactive robot may extract the verbal property of the interlocutor, including at least one of the pitch of voice, the amplitude of voice, and the speed of speech, by analyzing the voice information about the interlocutor. Also, the apparatus 200 for determining the speech and motion properties of an interactive robot may extract the nonverbal property of the interlocutor, including at least one of the frequency of use of motions and a motion size, by analyzing the image information about the interlocutor.

Also, the apparatus 200 for determining the speech and motion properties of an interactive robot may determine the speech property and the motion property of the interactive robot 100 based on at least one of the extracted verbal property, the extracted nonverbal property, information about the default settings of the interactive robot 100, and context information inferred from the content of the conversation between the interactive robot 100 and the interlocutor 300.

Also, the apparatus 200 for determining the speech and motion properties of an interactive robot may control the interactive robot 100 by transmitting an operation control signal, including the determined speech property and motion property, to the interactive robot 100.

For the convenience of description, the interactive robot 100 and the apparatus 200 for determining the speech and motion properties of an interactive robot were described as separate devices, but the apparatus 200 for determining the speech and motion properties of an interactive robot may be implemented so as to be installed in the interactive robot 100.

The interlocutor 300 may have a conversation with the interactive robot 100, and may be a human or another interactive robot 100.

The interlocutor 300 may be implemented as a device capable of communicating, and a human may have a conversation with the interactive robot 100 using the interlocutor 300 in the form of a device.

Hereinafter, the configuration of an apparatus for determining the speech and motion properties of an interactive robot according to an embodiment of the present invention will be described in more detail with reference to FIG. 2.

Figure 2:
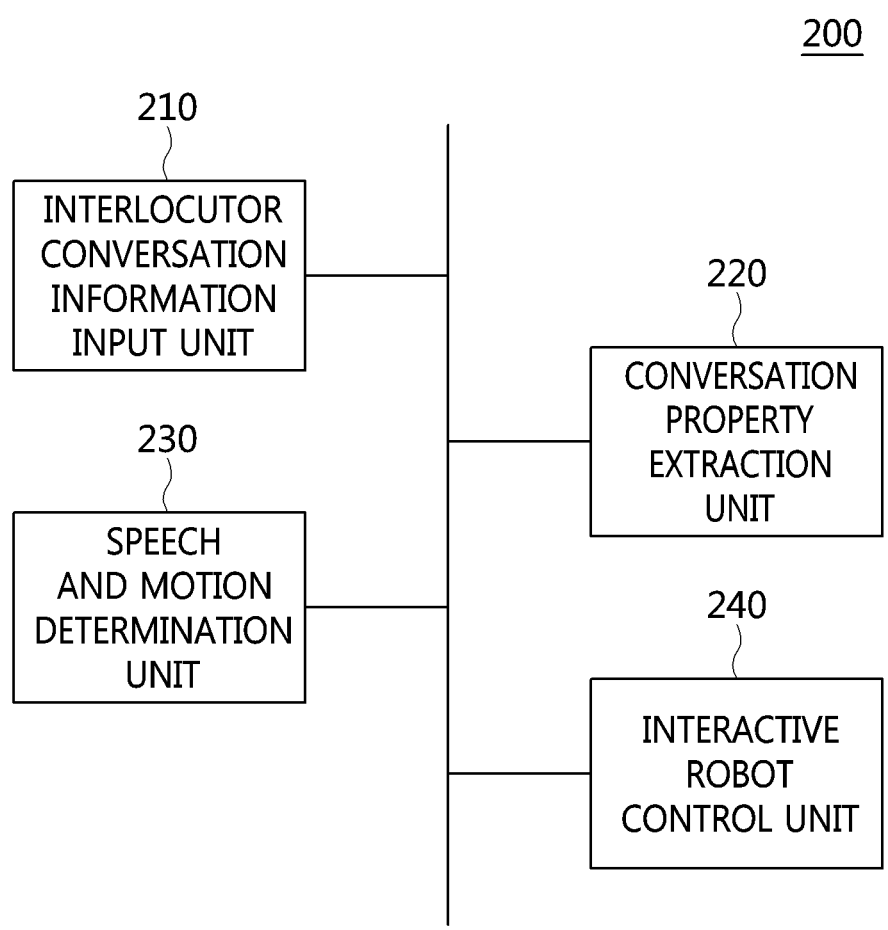
FIG. 2 is a block diagram that shows the configuration of an apparatus for determining the speech and motion properties of an interactive robot according to an embodiment of the present invention.

FIG. 2 is a block diagram that shows the configuration of an apparatus for determining the speech and motion properties of an interactive robot according to an embodiment of the present invention.

As illustrated in FIG. 2, the apparatus 200 for determining the speech and motion properties of an interactive robot includes an interlocutor conversation information input unit 210, a conversation property extraction unit 220, a speech and motion determination unit 230, and an interactive robot control unit 240.

The interlocutor conversation information input unit 210 receives interlocutor conversation information about the interlocutor 300 that interacts with the interactive robot 100. Here, the interlocutor conversation information may include at least one of voice information and image information of the interlocutor 300.

The conversation property extraction unit 220 extracts at least one of a verbal property and a nonverbal property of the interlocutor by analyzing the interlocutor conversation information.

The conversation property extraction unit 220 may extract a verbal property, including at least one of the pitch of voice, the amplitude of voice, and the speed of speech of the interlocutor, by analyzing the voice information of the interlocutor 300.

Also, the conversation property extraction unit 220 may extract a nonverbal property, including at least one of a motion size and the frequency of motions used by the interlocutor, by analyzing the image information of the interlocutor 300.

The speech and motion determination unit 230 may determine at least one of the speech property and the motion property of the interactive robot 100 based on at least one of the verbal property, the nonverbal property, information about the default settings of the interactive robot 100, and context information inferred from the content of the conversation between the interactive robot 100 and the interlocutor 300.

The speech and motion determination unit 230 determines the speech property and the motion property of the interactive robot 100 based on the information about the default settings of the interactive robot 100, thereby outputting speech and motions in consideration of the personality of the interactive robot 100.

Also, the speech and motion determination unit 230 may infer context information from the content of the conversation with the interlocutor 300, extract information about the change of the verbal property of the interlocutor 300, and set the speech property of the interactive robot 100 using the context information and the information about the change of the verbal property.

Here, the speech and motion determination unit 230 may extract the information about the change of the verbal property of the interlocutor 300 using the basic speech property of the interlocutor 300 and the verbal property of the interlocutor 300 observed during a preset time period.

The speech and motion determination unit 230 may infer the context information based on the content of the conversation with the interlocutor 300. Here, the context information may be calculated to any one of a copy mode for emulating the verbal property of the interlocutor 300, a contrary mode for responding contrary to the verbal property of the interlocutor 300, and a default setting mode.

Also, the speech and motion determination unit 230 may calculate the motion size of the interlocutor 300 using information about the skeleton of the interlocutor 300 and count the number of motions used by the interlocutor 300 during the preset time period.

Here, the speech and motion determination unit 230 may extract information about the skeleton of the interlocutor 300 from the image information and perform normalization for joint coordinates included in the extracted skeleton information. The speech and motion determination unit 230 may calculate the motion size of the interlocutor 300 and the frequency of motions used by the interlocutor 300 using the normalized skeleton information.

When it calculates the motion size, the speech and motion determination unit 230 may calculate the motion size of the interlocutor 300 using the difference between the maximum value and the minimum value of the joint coordinates during a unit time period.

Also, when it calculates the frequency of use of motions, the speech and motion determination unit 230 may determine whether the interlocutor 300 uses a motion based on the change of the joint coordinates during the unit time period, and may then count the number of used motions.

After it calculates at least one of the motion size of the interlocutor 300 and the frequency of motions used by the interlocutor 230, the speech and motion determination unit 230 assigns a weight thereto and assigns a weight to the basic motion property of the interactive robot 100, thereby determining the motion property of the interactive robot 100.

The interactive robot control unit 240 may control the operation of the interactive robot based on the determined speech property and motion property of the interactive robot.

The interactive robot control unit 240 may control the interactive robot 100 so as to speak depending on the speech property of the interactive robot, which includes at least one of the pitch of voice, the amplitude of voice, and the speed of speech. Also, the interactive robot control unit 240 may control the interactive robot 100 so as to move depending on the motion property of the interactive robot, which includes at least one of the frequency of use of motions and the motion size.

When the apparatus 200 for determining the speech and motion properties of an interactive robot is implemented as a device that is separate from the interactive robot 100, the apparatus 200 for determining the speech and motion properties of an interactive robot may transmit an operation control signal, including at least one of the speech property and the motion property, to the interactive robot 100.

Conversely, when the apparatus 200 for determining the speech and motion properties of an interactive robot is implemented so as to be included in the interactive robot 100, the apparatus 200 for determining the speech and motion properties of an interactive robot may control the interactive robot 100 so as to speak depending on the speech property and to move depending on the motion property.

Hereinafter, a method for determining the speech and motion properties of an interactive robot, performed by an apparatus for determining the speech and motion properties of an interactive robot, according to an embodiment of the present invention will be described in more detail with reference to FIG. 3.

Figure 3:
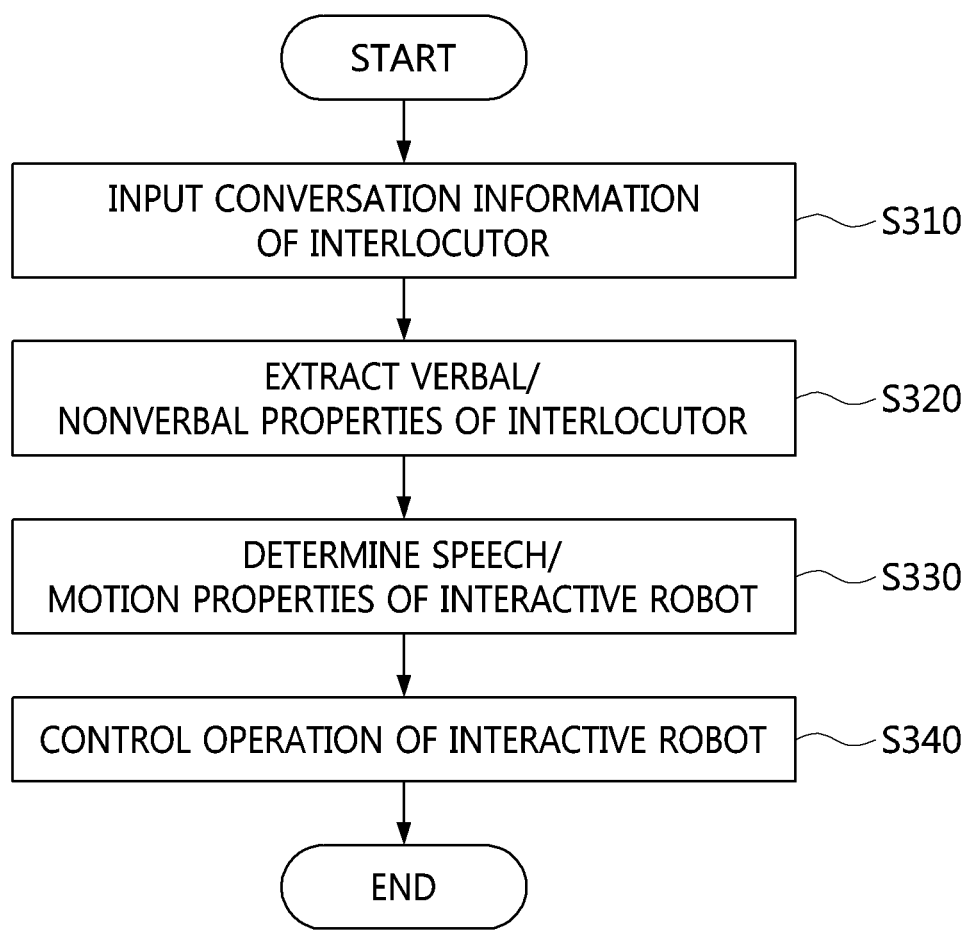
FIG. 3 is a flowchart for explaining a method for determining the speech and motion properties of an interactive robot according to an embodiment of the present invention.

FIG. 3 is a flowchart for explaining a method for determining the speech and motion properties of an interactive robot according to an embodiment of the present invention.

First, the apparatus 200 for determining the speech and motion properties of an interactive robot receives the conversation information of the interlocutor 300 at step S310.

Here, the apparatus 200 for determining the speech and motion properties of an interactive robot receives the interlocutor conversation information, which includes voice information and image information about the interlocutor 300.

Here, the apparatus 200 for determining the speech and motion properties of an interactive robot may receive the interlocutor conversation information from the interactive robot 100 or from the interlocutor 300 implemented in the form of a device that is capable of communicating. Also, the apparatus 200 for determining the speech and motion properties of an interactive robot may collect the interlocutor conversation information using a microphone, a camera, and the like included therein, but the method of receiving the conversation information about the interlocutor 300 that is interacting with the interactive robot 100 is not limited thereto.

Then, the apparatus 200 for determining the speech and motion properties of an interactive robot extracts the verbal property and the nonverbal property of the interlocutor 300 at step S320.

The apparatus 200 for determining the speech and motion properties of an interactive robot may extract a verbal properties and a nonverbal property from the voice information and the image information, respectively, which are input at step S310. Here, the verbal property may include at least one of the pitch of voice, the amplitude of voice, and the speed of speech of the interlocutor 300, and the nonverbal property may include at least one of the frequency of motions used by the interlocutor 300 and the motion size of the interlocutor 300.

Then, the apparatus 200 for determining the speech and motion properties of an interactive robot determines the speech property and the motion property of the interactive robot 100 at step S330.

The apparatus 200 for determining the speech and motion properties of an interactive robot may determine the speech property and the motion property of the interactive robot based on at least one of the extracted verbal property and nonverbal property of the interlocutor 300, information about the default settings of the interactive robot 100, and context information about the conversation between the interactive robot 100 and the interlocutor 300.

Particularly, the apparatus 200 for determining the speech and motion properties of an interactive robot may determine the speech property of the interactive robot 100 by combining two or more of the verbal property of the interlocutor 300, the information about the default settings of the interactive robot 100, and the context information.

When it determines the speech property of the interactive robot 100, the apparatus 200 for determining the speech and motion properties of an interactive robot may reflect the information about the default settings of the interactive robot 100, thereby controlling the interactive robot 100 so as to speak in consideration of the personality thereof.

Also, when it determines the speech property of the interactive robot 100, the apparatus 200 for determining the speech and motion properties of an interactive robot may reflect the context information inferred from the content of the conversation between the interactive robot 100 and the interlocutor 300, thereby controlling the interactive robot 100 so as to speak appropriately for the conversation situation or the conversation content.

Also, the apparatus 200 for determining the speech and motion properties of an interactive robot may determine the motion property of the interactive robot 100 by combining the nonverbal property of the interlocutor 300 and the information about the default settings of the interactive robot 100.

When it determines the motion property of the interactive robot 100, the apparatus 200 for determining the speech and motion properties of an interactive robot may reflect the information about the default settings of the interactive robot 100, thereby controlling the interactive robot 100 so as to move in consideration of the personality thereof.

Also, when it determines the motion property of the interactive robot 100, the apparatus 200 for determining the speech and motion properties of an interactive robot may reflect the frequency of use of motions and the motion size, which are the nonverbal properties of the interlocutor 300, thereby controlling the interactive robot 100 so as to make a motion through which the interlocutor 300 may feel peaceful and friendly.

The process of determining the speech property and motion property of the interactive robot 100, which was described at step S330, will be described in more detail through a description of step S440 in FIG. 4 and a description of step S640 in FIG. 6.

Finally, the apparatus 200 for determining the speech and motion properties of an interactive robot controls the operation of the interactive robot 100 at step S340.

The apparatus 200 for determining the speech and motion properties of an interactive robot controls the interactive robot 100 so as to operate based on the speech property and the motion property of the interactive robot 100, which are determined at step S330.

Here, when the apparatus 200 for determining the speech and motion properties of an interactive robot is implemented as a device that is separate from the interactive robot 100, the apparatus 200 for determining the speech and motion properties of an interactive robot may control the output of the speech and motions of the interactive robot 100 by transmitting an operation control signal, including the speech property and the motion property, to the interactive robot 100.

Hereinafter, the process in which an apparatus for determining the speech and motion properties of an interactive robot determines the speech property of an interactive robot according to an embodiment of the present invention will be described in detail with reference to FIG. 4 and FIG. 5.

Figure 4:
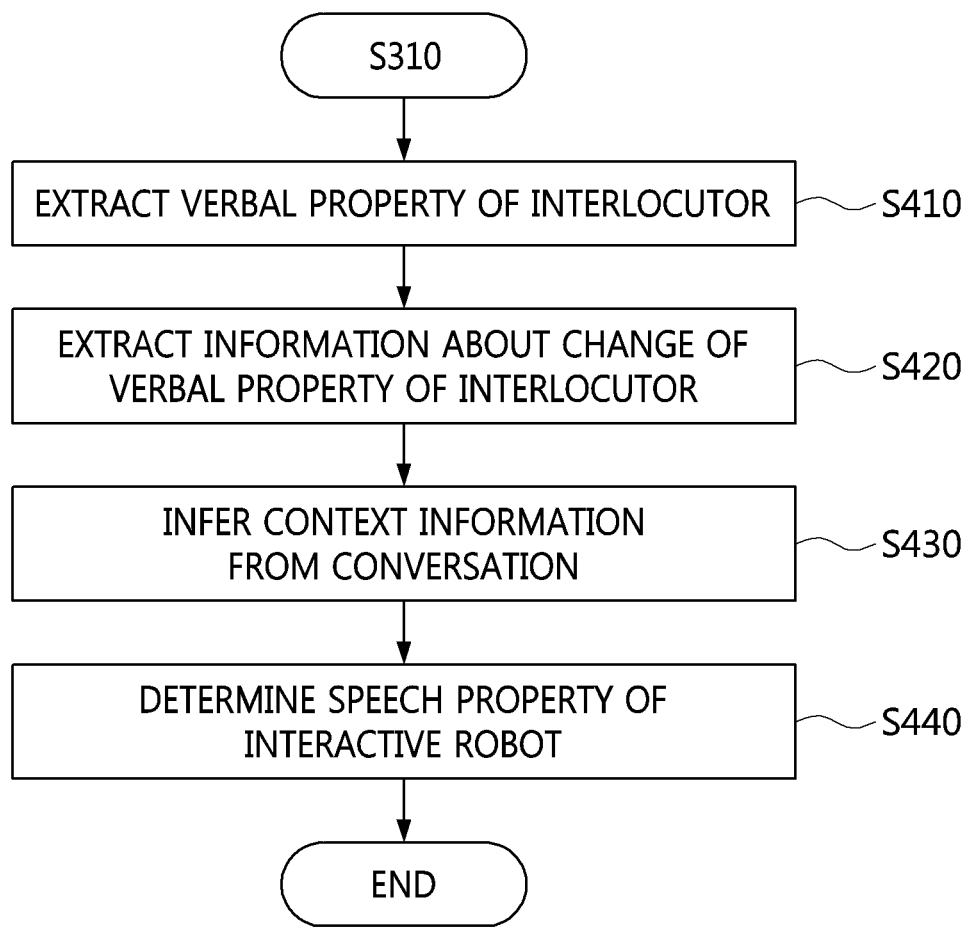
FIG. 4 is a flowchart that shows a method for determining the speech property of an interactive robot according to an embodiment of the present invention.
Figure 5:
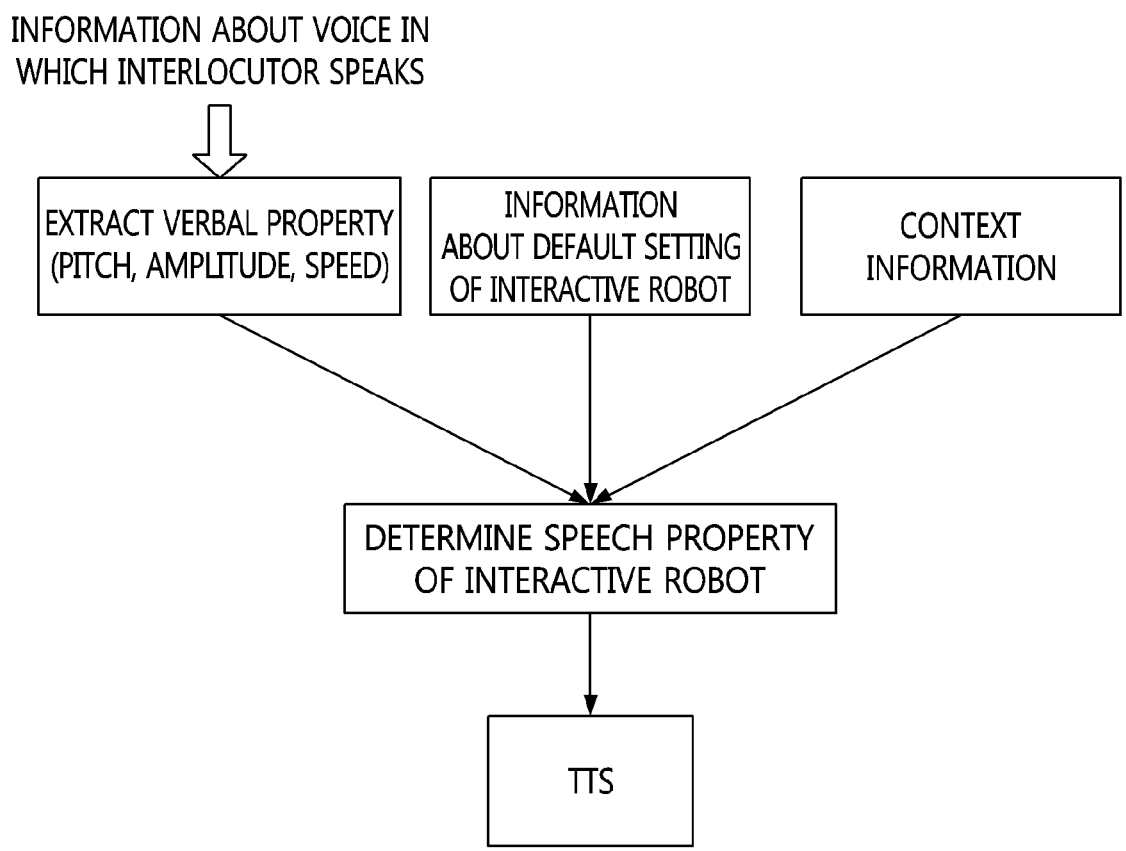
FIG. 5 is a view for explaining the process in which an apparatus for determining the speech and motion properties of an interactive robot determines a speech property according to an embodiment of the present invention.

FIG. 4 is a flowchart that shows a method for determining the speech property of an interactive robot according to an embodiment of the present invention, and FIG. 5 is a view for explaining the process in which an apparatus for determining the speech and motion properties of an interactive robot determines a speech property according to an embodiment of the present invention.

First, the apparatus 200 for determining the speech and motion properties of an interactive robot extracts the verbal property of the interlocutor 300 at step S410.

The apparatus 200 for determining the speech and motion properties of an interactive robot may extract the verbal property of the interlocutor from the voice information about the interlocutor. Here, the apparatus 200 for determining the speech and motion properties of an interactive robot may extract the verbal property, which includes at least one of the pitch of voice, the amplitude of voice, and the speed of speech of the interlocutor.

Then, the apparatus 200 for determining the speech and motion properties of an interactive robot extracts information about the change of the verbal property of the interlocutor 300 at step S420.

The apparatus 200 for determining the speech and motion properties of an interactive robot may extract the information about the change of the verbal property using the basic verbal property of the interlocutor 300 and using the verbal property of the interlocutor 300 observed during a preset time period.

The apparatus 200 for determining the speech and motion properties of an interactive robot may extract $Pitch^{human\_recent}$, $Amplitude^{human\_recent}$, and $Speed^{human\_recent}$, which are the verbal properties for the voice spoken by the interlocutor 300 during the most recent M hours, from the voice information. Then, the apparatus 200 for determining the speech and motion properties of an interactive robot calculates the difference between the verbal property during the most recent M hours and the basic verbal property of the interlocutor 300, as shown in the following Equation (1), thereby extracting the information about the change of the verbal property.

$$\text{change of pitch of voice} = Pitch^{human\_recent} - Pitch^{human\_base}$$

$$\text{change of amplitude of voice} = Amplitude^{human\_recent} - Amplitude^{human\_base}$$

$$\text{change of speed of speech} = Speed^{human\_recent} - Speed^{human\_base} \quad (1)$$

Here, $Pitch^{human\_base}$, $Amplitude^{human\_base}$, and $Speed^{human\_base}$, which are the basic verbal properties of the interlocutor 300, means the verbal properties of all of the speech spoken by the interlocutor 300, and may be extracted from the voice information.

Then, the apparatus 200 for determining the speech and motion properties of an interactive robot infers context information from the content of a conversation.

The apparatus 200 for determining the speech and motion properties of an interactive robot infers context information, which is information about the situation where a conversation is taking place, from the content of the conversation between the interactive robot 100 and the interlocutor 300. The apparatus 200 for determining the speech and motion properties of an interactive robot may recognize the mood of the conversation, and may set the context information to any one of −1, 0 and +1 based on the recognized mood.

The following Pseudocode 1 shows an example of pseudocode for a method for inferring context.

[Pseudocode 1]

```
if Sentiment (speech of the robot) == 'Neutral'
    Context = 0
Else if Sentiment (speech of the interlocutor) == Sentiment (speech of the robot)
    Context = 1
Else
    Context = −1
```

As shown in Pseudocode 1, when the mood is determined to be a neutral state in which no sentiment is expressed in the speech of the interactive robot 100, the apparatus 200 for determining the speech and motion properties of an interactive robot sets the value of Context to 0, and when the mood of the speech of the interlocutor 300 is the same as that of the interactive robot 100, the apparatus 200 for determining the speech and motion properties of an interactive robot may set the value of Context to +1.

Also, when the mood of the speech of the interlocutor 300 is contrary to that of the interactive robot 100, the apparatus 200 for determining the speech and motion properties of an interactive robot may set the value of Context to −1.

For example, when the interlocutor 300 gets angry and when the interactive robot 100 speaks in order to calm the interlocutor 300, because the mood of the speech of the interlocutor 300 is contrary to that of the interactive robot 100, the apparatus 200 for determining the speech and motion properties of an interactive robot may set the value of Context to −1.

Finally, the apparatus 200 for determining the speech and motion properties of an interactive robot determines the speech property of the interactive robot 100 at step S440.

The apparatus 200 for determining the speech and motion properties of an interactive robot determines the speech property of the interactive robot 100 based on at least one of the information about the change of the verbal property of the interlocutor 300, which is extracted at step S420, the context information, which is inferred at step S430, and information about the default settings of the interactive robot 100.

Here, the speech property of the interactive robot 100 may include at least one of the pitch of voice, the amplitude of voice, and the speed of speech.

The information about the default settings of the interactive robot 100 represents the unique personality of the interactive robot 100, and $Pitch^{robot\_base}$, $Amplitude^{robot\_base}$, and $Speed^{robot\_base}$ may be included therein. Here, the default settings of the interactive robot 100 may be configured by the manufacturer or owner of the robot.

For example, if the interactive robot 100 is a female robot, $Pitch^{robot\_base}$ may be set high, but if the interactive robot 100 is a male robot, $Pitch^{robot\_base}$ may be set low. That is, the personality of the interactive robot 100 may be reflected by changing the default settings of the interactive robot 100.

The apparatus 200 for determining the speech and motion properties of an interactive robot may determine the speech property of the interactive robot 100 as shown in the following Pseudocode 2. The following Pseudocode 2 shows an example of pseudocode for a method for determining the pitch of voice, the amplitude of voice, and the speed of speech, which are the speech properties of the interactive robot 100.

[Pseudocode 2]

Pitch$^{robot}$ <- Pitch$^{robot\_base}$ + Context * (Pitch$^{human\_recent}$ - Pitch$^{human\_base}$)
Amplitude$^{robot}$ <- Amplitude$^{robot\_base}$ + Context * (Amplitude$^{human\_recent}$ - Amplitude$^{human\_base}$)
Speed$^{robot}$ <- Speed$^{robot\_base}$ + Context * (Speed$^{human\_recent}$ - Speed$^{human\_base}$)

As shown in Pseudocode 2, the apparatus 200 for determining the speech and motion properties of an interactive robot may determine the speech properties of the interactive robot 100 by multiplying the information about the change of the verbal property of the interlocutor 300 by the value of Context and by adding the information about the default settings of the interactive robot 100 thereto.

In Pseudocode 2, when the value of Context is 0, the apparatus 200 for determining the speech and motion properties of an interactive robot may determine the speech properties of the interactive robot 100 based only on the information about the default settings of the interactive robot 100, which have been set in advance, without incorporating the verbal property of the interlocutor 300.

Conversely, when the value of Context is +1, the apparatus 200 for determining the speech and motion properties of an interactive robot may determine the speech properties of the interactive robot 100 by emulating the verbal properties of the interlocutor 300.

For example, when the value of Context is +1 and when the interlocutor 300 is shouting loudly, the speech property of the interactive robot 100 may be determined such that the volume of voice is set high by emulating the shout by the interlocutor 300.

When the value of Context is -1, the apparatus 200 for determining the speech and motion properties of an interactive robot may determine the speech property of the interactive robot 100 such that the interactive robot 100 has a property contrary to the verbal property of the interlocutor 300.

For example, when the value of Context is -1 and when the interlocutor 300 is speaking fast and loudly, the apparatus 200 for determining the speech and motion properties of an interactive robot may determine the speech property of the interactive robot 100 such that the interactive robot 100 responds calmly by setting the volume of voice and the speed of speech low and slow, respectively, contrary to the loud and fast speech of the interlocutor 300.

Hereinafter, the process in which an apparatus for determining the speech and motion properties of an interactive robot determines the motion property of an interactive robot according to an embodiment of the present invention will be described in more detail with reference to FIGS. 6 to 9.

Figure 6:
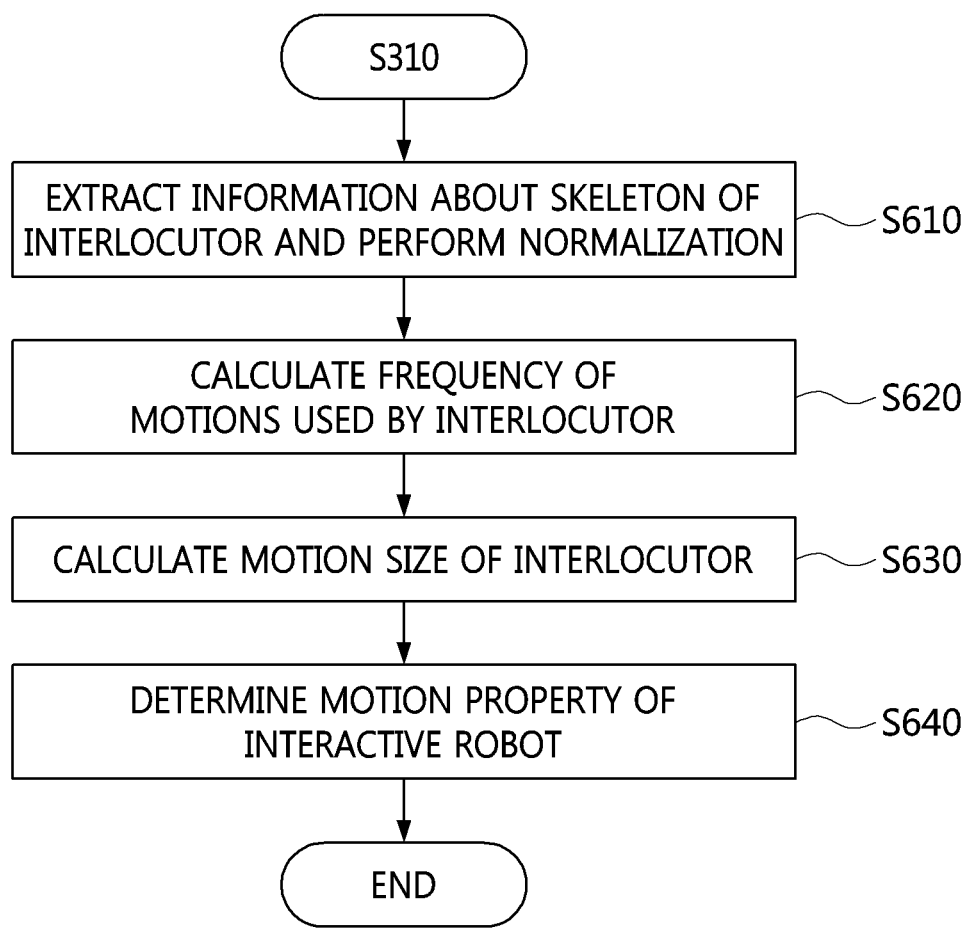
FIG. 6 is a flowchart that shows a method for determining the motion property of an interactive robot according to an embodiment of the present invention.
Figure 7:
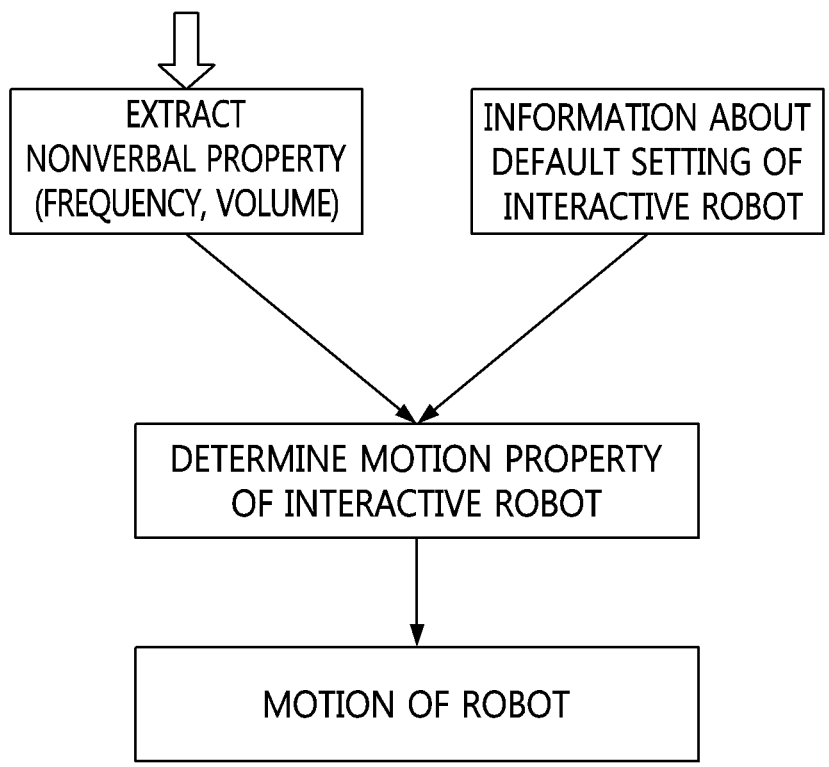
FIG. 7 is a view for explaining the process in which an apparatus for determining the speech and motion properties of an interactive robot determines a motion property according to an embodiment of the present invention.

FIG. 6 is a flowchart that shows a method for determining the motion property of an interactive robot according to an embodiment of the present invention, and FIG. 7 is a view for explaining the process in which an apparatus for determining the speech and motion properties of an interactive robot determines a motion property according to an embodiment of the present invention.

First, the apparatus 200 for determining the speech and motion properties of an interactive robot extracts information about the skeleton of the interlocutor 300 and performs normalization at step S610.

The apparatus 200 for determining the speech and motion properties of an interactive robot extracts information about the skeleton of the interlocutor 300 from image information. Here, the image information may be acquired by capturing the image of the interlocutor 300 from the viewpoint of the interactive robot 100.

The apparatus 200 for determining the speech and motion properties of an interactive robot may perform step S610 in order to extract the nonverbal property of the interlocutor 300, as shown in FIG. 7.

At step S610, the apparatus 200 for determining the speech and motion properties of an interactive robot may extract information about the skeleton using existing image recognition software or a 3D sensor, such as a Kinect or the like.

Figure 8:
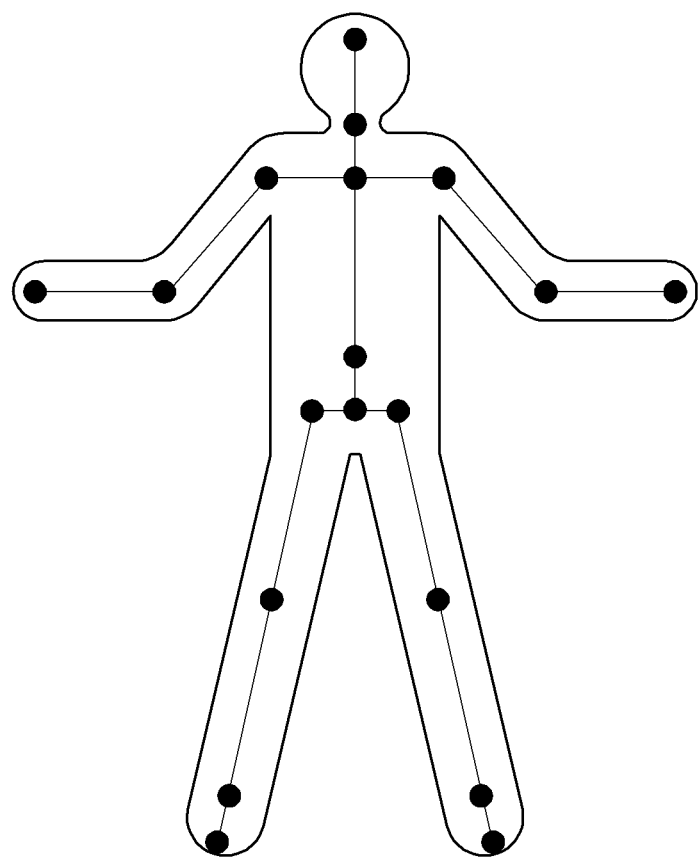
FIG. 8 is an exemplary view for explaining the process of extracting skeleton information at step S610 of FIG. 6.

FIG. 8 is an exemplary view for explaining the process of extracting skeleton information at step S610 in FIG. 6.

As illustrated in FIG. 8, the point of each joint may be represented as x and y coordinates ($J^{raw}_i=(x_i, y_i)$) in the extracted skeleton information, and the number of joints is 19, and i may thus have a value that ranges from 1 to 19.

Then, the apparatus 200 for determining the speech and motion properties of an interactive robot may perform normalization based on the center point of the body ($J_i=J^{raw}_i-J_{center}$) such that the coordinates of joints have a value within a certain range. Here, the center point of the body may be the joint coordinates corresponding to the center point of the interlocutor in the skeleton information.

Then, the apparatus 200 for determining the speech and motion properties of an interactive robot calculates the frequency of motions used by the interlocutor 300 at step S620.

When it is determined that there is movement, the degree of which is equal to or greater than a preset threshold value, the apparatus 200 for determining the speech and motion properties of an interactive robot determines that the interlocutor 300 makes a motion and counts the number of times such movement is caught, thereby calculating the frequency of use of motions.

The following Pseudocode 3 shows an example of pseudocode for a method for calculating the frequency of motions used by the interlocutor 300.

[Pseudocode 3]
time_slot = (T, T - T$_s$), (T - T$_s$, T - 2 * T$_s$), ... (T - (N - 1) * T$_s$, T - N * T$_s$)
frequency = 0
for each time_slot i $$\text{motion\_sum} = \sum_{t=time\_slot_i(0)}^{time\_slot_i(1)} \text{distance}(J_t - J_{time\_slot_i(0)})$$

if motion_sum > threshold
  frequency += 1
frequency = frequency / N

Here, $T_s$ denotes a unit of time, and N denotes the number of unit time sections during which the frequency of use of motions is to be measured. For example, when the frequency of use of motions is measured during the most recent one minute, $T_s$ and N may be set to 10 seconds and 6, respectively.

Describing again FIG. 6, the apparatus 200 for determining the speech and motion properties of an interactive robot calculates the motion size of the interlocutor 300 at step S630.

The motion size of the interlocutor 300 represents how large the motion made by the interlocutor 300 is, and the apparatus 200 for determining the speech and motion properties of an interactive robot may calculate the size of the motion made by the interlocutor 300 using the difference between the maximum value and the minimum value of each of x and y coordinates of a joint.

Figure 9:
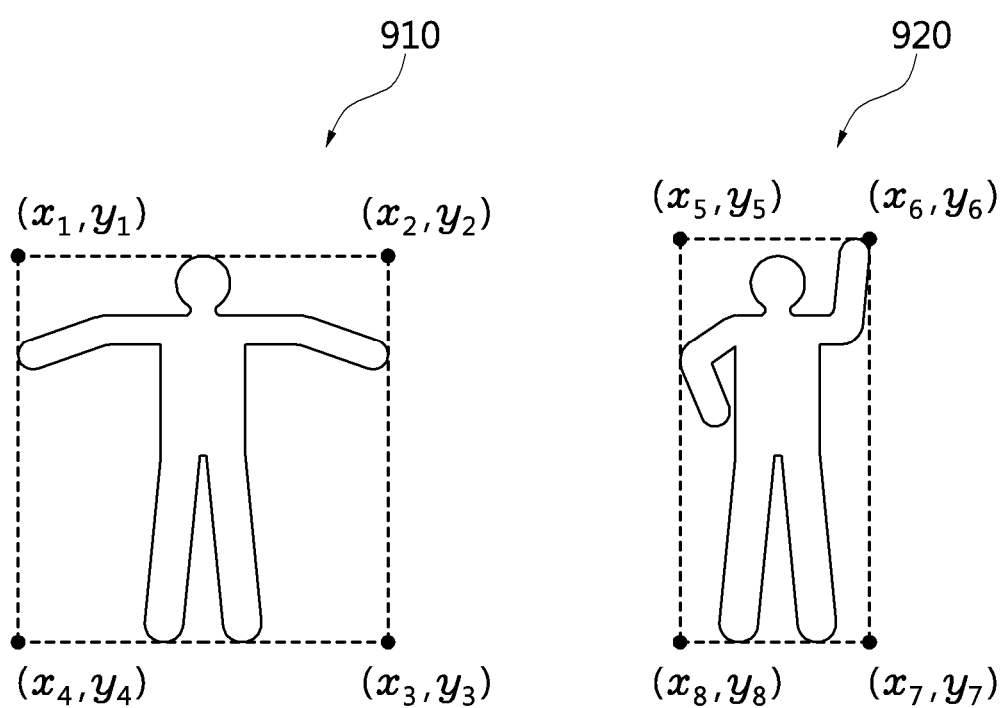
FIG. 9 is an exemplary view for explaining the process of calculating a motion size at step S630 of FIG. 6.

FIG. 9 is an exemplary view for explaining the process of calculating a motion size at step S630 of FIG. 6.

When the interlocutor 300 makes a large motion by outstretching two arms like the first motion 910 illustrated in FIG. 9, the motion size of the interlocutor 300 increases. Conversely, when the interlocutor 300 makes a small motion like the second motion 920, the motion size of the interlocutor 300 has a small value.

In FIG. 9, a rectangular box is set using the maximum values of the joint coordinates depending on the motion made by the interlocutor 300, and the motion size of the interlocutor 300 is described as being calculated using the size of the set rectangular box, but without limitation thereto, the motion size may be calculated using the joint coordinates depending on the movement of the arms or hands of the interlocutor 300.

The process of calculating the frequency of motions used by the interlocutor 300 at step S620 and the process of calculating the motion size of the interlocutor 300 at steps S630 are actually the same as the process of extracting the nonverbal properties of the interlocutor 300 at step S320 in FIG. 3, and a repeated description will thus be omitted for the convenience of description.

Finally, the apparatus 200 for determining the speech and motion properties of an interactive robot determines the motion property of the interactive robot 100 at step S640.

The apparatus 200 for determining the speech and motion properties of an interactive robot may determine the motion property of the interactive robot based on the frequency of motions used by the interlocutor 300, which is calculated at step S620, the size of the motion made by the interlocutor 300, which is calculated at step S630, and default setting information corresponding to the personality of the interactive robot 100.

Here, the motion property of the interactive robot 100, determined by the apparatus 200 for determining the speech and motion properties of an interactive robot, may include at least one of the frequency of use of motions and the motion size.

The apparatus 200 for determining the speech and motion properties of an interactive robot assigns a first weight to $Frequency^{human}$ and $Volume^{human}$, which represent the frequency of use of motions and the motion size, which are the nonverbal properties of the interlocutor 300, and assigns a second weight to $Frequency^{robot\_base}$ and $Volume^{robot\_base}$, which are the basic motion properties of the information about the default settings of the interactive robot 100, thereby determining the motion property of the interactive robot 100.

The following Pseudocode 4 shows an example of pseudocode for a method for determining the motion property of the interactive robot 100 by assigning weights to the nonverbal properties of the interlocutor 300 and the basic motion properties of the interactive robot 100.

| [Pseudocode 4] |
|---|
| $Frequency^{robot} \leftarrow$ w * $Frequency^{human}$ + (1 − w) * $Frequency^{robot\_base}$<br>$Volume^{robot} \leftarrow$ w * $Volume^{human}$ + (1 − w) * $Volume^{robot\_base}$ |

Here, w denotes the first weight, and (1-w) denotes the second weight. The weights may be set by the manufacturer or owner of the robot.

The following Pseudocode 5 shows an example of pseudocode for a method for creating the motion to be output by the interactive robot 100 based on the determined motion property of the interactive robot 100.

| [Pseudocode 5] |
|---|
| for each word in speech_sentence<br>   if random( ) < $Frequency^{robot}$<br>      gesture = get_gesture(word)<br>      make_gesture(gesture, $Volume^{robot}$) |

Here, speech_sentence denotes the sentence to be spoken by the interactive robot 100.

The apparatus 200 for determining the speech and motion properties of an interactive robot may set the interactive robot 100 so as to make a motion for every word in the sentence to be spoken by the interactive robot 100, and may determine whether to create and output a motion depending on $Frequency^{robot}$, which is the frequency of motions to be made by the interactive robot 100, as shown in Pseudocode 5.

For example, when the value of $Frequency^{robot}$, which represents the frequency of motions to be made by the interactive robot 100, is 0.7, the apparatus 200 for determining the speech and motion properties of an interactive robot may create motions for seven words, among ten words included in the sentence to be spoken by the interactive robot 100.

Also, the apparatus 200 for determining the speech and motion properties of an interactive robot may create an operation control signal for making the interactive robot 100 output the created motion so as to have a size corresponding to the value of $Volume^{robot}$, which represents the motion size.

In Pseudocode 5, get_gesture, which is a function for selecting a motion suitable for each word, and make_gesture, which is a function for making the interactive robot 100 make the selected motion, may be implemented in different manners for respective robot manufacturers.

Figure 10:
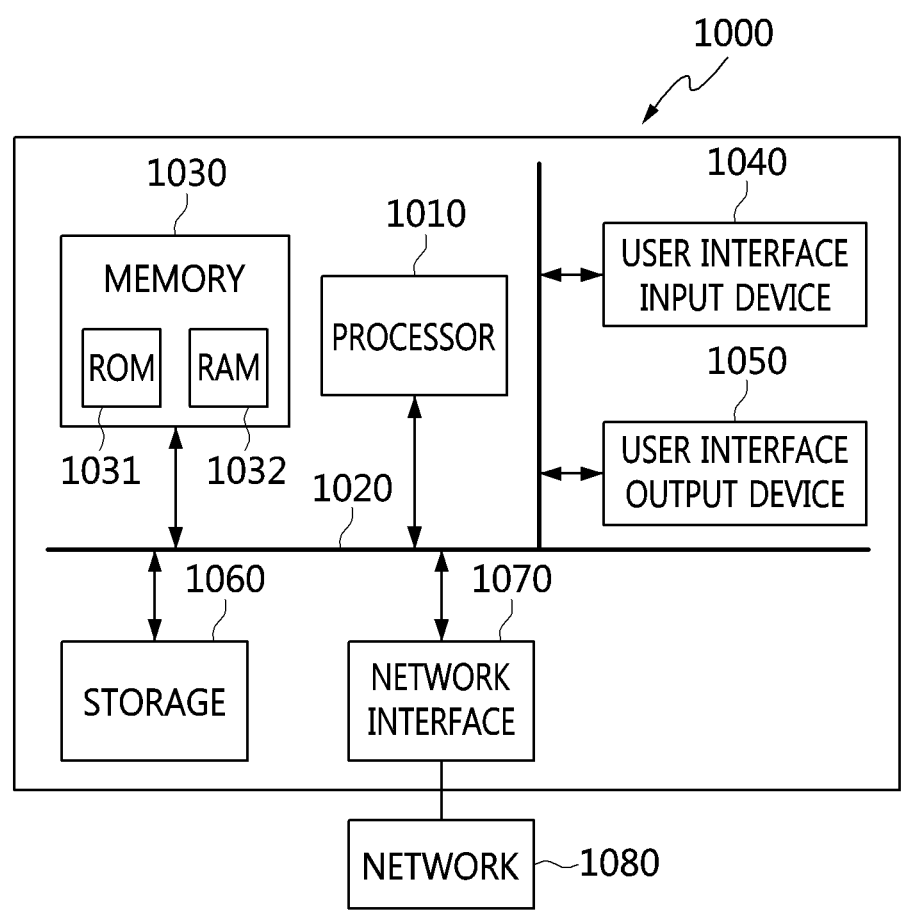
FIG. 10 is a block diagram that shows a computer system according to an embodiment of the present invention.

FIG. 10 is a block diagram that shows a computer system according to an embodiment of the present invention.

Referring to FIG. 10, an embodiment of the present invention may be implemented in a computer system 1000 including a computer-readable recording medium. As illustrated in FIG. 10, the computer system 1000 may include at least one processor 1010, memory 1030, a user interface input device 1040, a user interface output device 1050, and storage 1060, which communicate with each other via a bus 1020. Also, the computer system 1000 may further include a network interface 1070 connected to a network 1080. The processor 1010 may be a central processing unit or a semiconductor device for executing processing instructions stored in the memory 1030 or the storage 1060. The memory 1030 and the storage 1060 may be various types of volatile or nonvolatile storage media. For example, the memory may include ROM 1031 or RAM 1032.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, the speech property and the motion property of an interactive robot may be changed in consideration of the personality thereof and the verbal property of the interlocutor that has a conversation with the interactive robot.

Also, according to the present invention, the speech property and the motion property of an interactive robot are changed depending on the surroundings and on an interlocutor, whereby the interlocutor may feel that the interactive robot is friendly and intelligent.

As described above, the apparatus and method for determining the speech and motion properties of an interactive robot according to the present invention are not limitedly applied to the configurations and operations of the above-described embodiments, but all or some of the embodiments may be selectively combined and configured, so that the embodiments may be modified in various ways.

What is claimed is:

1. A method for determining speech and motion properties of an interactive robot, performed by an apparatus for determining speech and motion properties of an interactive robot, the method comprising:
    receiving interlocutor conversation information that includes at least one of voice information and image information about an interlocutor that interacts with an interactive robot;
    extracting at least one of a verbal property and a nonverbal property of the interlocutor by analyzing the interlocutor conversation information;
    determining at least one of a speech property and a motion property of the interactive robot based on at least one of the verbal property, the nonverbal property, and context information inferred from content of a conversation between the interactive robot and the interlocutor; and
    controlling an operation of the interactive robot based on at least one of the determined speech property and the determined motion property of the interactive robot,
    wherein the extracting at least one of the verbal property and the nonverbal property includes inferring the context information from the content of the conversation with the interlocutor, and extracting information about a change of the verbal property of the interlocutor using a basic verbal property of the interlocutor and using verbal property information of the interlocutor during a predetermined time period,
    wherein the determining at least one of the speech property and the motion property uses the information about the change of the verbal property of the interlocutor for determining the speech property of the interactive robot.

2. The method of claim 1, wherein extracting at least one of the verbal property and the nonverbal property of the interlocutor is configured to:
    extract the verbal property of the interlocutor, including at least one of a pitch of a voice, an amplitude of the voice, and a speed of speech, by analyzing the voice information, or
    extract the nonverbal property of the interlocutor, including at least one of a frequency of motions used by the interlocutor and a motion size, by analyzing the image information.

3. The method of claim 2, wherein determining at least one of the speech property and the motion property of the interactive robot is configured to set the speech property of the interactive robot based on at least one of information about default settings of the interactive robot, the context information, and the extracted verbal property.

4. The method of claim 2, wherein determining at least one of the speech property and the motion property of the interactive robot is configured to set the motion property of the interactive robot based on at least one of the extracted nonverbal property and information about default settings of the interactive robot.

5. The method of claim 4, wherein extracting at least one of the verbal property and the nonverbal property of the interlocutor comprises:
    extracting information about a skeleton of the interlocutor from the image information;
    performing normalization for joint coordinates of the extracted information about the skeleton;
    calculating the frequency of motions used by the interlocutor using the normalized information about the skeleton; and
    calculating the motion size of the interlocutor using the normalized information about the skeleton.

6. The method of claim 5, wherein calculating the frequency of motions used by the interlocutor is configured to determine whether the interlocutor uses a motion based on a change in the joint coordinates during a unit time period and to count a number of motions used by the interlocutor during a preset period.

7. The method of claim 5, wherein calculating the motion size of the interlocutor is configured to calculate the motion size of the interlocutor using a difference between a maximum value of the joint coordinates and a minimum value of the joint coordinates during a unit time period.

8. The method of claim 5, wherein determining at least one of the speech property and the motion property of the interactive robot comprises:
    determining the motion property of the interactive robot by adding the nonverbal property of the interlocutor, to which a first weight is assigned, and a basic motion property of the interactive robot, to which a second weight is assigned.

9. The method of claim 1, wherein inferring the context information is configured such that, based on the content of the conversation, the context information is calculated to any one of a copy mode for emulating the verbal property of the interlocutor, a default setting mode, and a contrary mode for responding contrary to the verbal property of the interlocutor.

10. The method of claim 1, wherein the image information about the interlocutor is captured from a viewpoint of the interactive robot.

11. An apparatus for determining speech and motion properties of an interactive robot, comprising:
    an interlocutor conversation information input unit for receiving interlocutor conversation information that includes at least one of voice information and image information about an interlocutor that interacts with an interactive robot;

an interlocutor conversation property extraction unit for extracting at least one of a verbal property and a nonverbal property of the interlocutor by analyzing the interlocutor conversation information;

a speech and motion determination unit for determining at least one of a speech property and a motion property of the interactive robot based on at least one of the verbal property, the nonverbal property, information about default settings of the interactive robot, and context information inferred from content of a conversation between the interactive robot and the interlocutor; and an interactive robot control unit for controlling an operation of the interactive robot based on at least one of the determined speech property and the determined motion property of the interactive robot, wherein the interlocutor conversation property extraction unit infers the context information from the content of the conversation with the interlocutor and extracts information about a change of the verbal property of the interlocutor using a basic verbal property of the interlocutor and using verbal property information of the interlocutor during a predetermined time period, wherein the speech and motion determination unit uses the information about the change of the verbal property of the interlocutor for determining the speech property of the interactive robot.

12. The apparatus of claim 11, wherein the interlocutor conversation property extraction unit extracts the verbal property of the interlocutor, including at least one of a pitch of a voice, an amplitude of the voice, and a speed of speech, by analyzing the voice information or extracts the nonverbal property of the interlocutor, including at least one of a frequency of motions used by the interlocutor and a motion size, by analyzing the image information.

13. The apparatus of claim 12, wherein the interlocutor conversation property extraction unit extracts information about a skeleton of the interlocutor from the image information, performs normalization for joint coordinates of the extracted information about the skeleton, calculates the frequency of motions used by the interlocutor using the normalized information about the skeleton, and calculates the motion size of the interlocutor using the normalized information about the skeleton.

14. The apparatus of claim 13, wherein the interlocutor conversation property extraction unit determines whether the interlocutor uses a motion based on a change in the joint coordinates during a unit time period and counts a number of motions used by the interlocutor during a preset period.

15. The apparatus of claim 13, wherein the interlocutor conversation property extraction unit calculates the motion size of the interlocutor using a difference between a maximum value of the joint coordinates and a minimum value of the joint coordinates during a unit time period.

16. The apparatus of claim 13, wherein the speech and motion determination unit determines the motion property of the interactive robot by adding the nonverbal property of the interlocutor, to which a first weight is assigned, and a basic motion property of the interactive robot, to which a second weight is assigned.

17. The apparatus of claim 11, wherein, based on the content of the conversation, the speech and motion determination unit calculates the context information to any one of a copy mode for emulating the verbal property of the interlocutor, a default setting mode, and a contrary mode for responding contrary to the verbal property of the interlocutor.

18. The apparatus of claim 11, wherein the image information about the interlocutor is captured from a viewpoint of the interactive robot.

* * * * *